(12) United States Patent
Tsubata et al.

(10) Patent No.: US 6,244,385 B1
(45) Date of Patent: Jun. 12, 2001

(54) LUBRICATION PRESSURE CONTROLLER

(75) Inventors: Yoshimichi Tsubata; Katsuyuki Narai; Eiji Suzuki; Daihei Teshima; Atsushi Fujikawa; Keiichi Hanyu; Masaaki Yamaguchi; Tomoyuki Kanda; Eiji Ohyama; Akinori Tanno, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,350

(22) Filed: Aug. 5, 1999

(30) Foreign Application Priority Data

Aug. 18, 1998 (JP) .................................................. 10-231549

(51) Int. Cl.[7] ....................................................... F01M 1/18
(52) U.S. Cl. .......................... 184/6.4; 184/6.22; 184/6.28; 184/26
(58) Field of Search ................................ 184/6.22, 6.21, 184/26, 6.28, 6.4

(56) References Cited

U.S. PATENT DOCUMENTS

| 2,926,737 | | 3/1960 | Fischer . | |
|---|---|---|---|---|
| 3,962,870 | * | 6/1976 | Lech | 60/428 |
| 4,682,518 | * | 7/1987 | Takada et al. | 74/867 |
| 4,747,327 | * | 5/1988 | Itoh et al. | 74/868 |
| 4,751,859 | * | 6/1988 | Itoh et al. | 74/868 |
| 5,415,603 | * | 5/1995 | Tuzuki et al. | 477/5 |

FOREIGN PATENT DOCUMENTS

| 0707 165 A2 | 4/1996 | (EP) . |
|---|---|---|
| 1-135254 | 9/1989 | (JP) . |
| 4-316766 | 11/1992 | (JP) . |

* cited by examiner

Primary Examiner—David Fenstermacher
(74) Attorney, Agent, or Firm—Arent Fox Kintner Plotkin & Kahn, PLLC (57) ABSTRACT

A lubrication pressure controller comprises a lubrication pressure regulating valve 41, which is provided in a lubrication oil passage 36 directing hydraulic oil to lubricated parts, and a cooler pressure regulating valve 42, which is provided in a discharge oil passage 51*b* of the lubrication pressure regulating valve 41. The lubrication pressure regulating valve 41 adjusts the pressure in the lubrication oil passage 36, and the cooler pressure regulating valve 42 adjusts the pressure supplied to an oil cooler 55. The hydraulic oil discharged from the cooler pressure regulating valve 42 is returned through a recirculation line 52 to a suction oil passage 31 of a pump. In this construction, an adequate supply of lubrication oil is maintained even if one of the valves experiences locking of a valve spool on an open side. Moreover, by providing signal pressure generating means 60, which applies a signal pressure to these two valves in correspondence with a driving condition, the lubrication pressure controller can be set to acquire a desired balance in the lubrication, cooling and recirculation for the hydraulic oil in response to a driving condition.

8 Claims, 6 Drawing Sheets

LUBRICATION PRESSURE CONTROLLER

FIELD OF THE INVENTION

The present invention relates generally to a hydraulic controller which controls the pressure of hydraulic oil, and particularly to a hydraulic controller which has a cooling circuit that cools part of the hydraulic oil through an oil cooler.

BACKGROUND OF THE INVENTION

Vehicles such as automobiles are equipped with a hydraulic controller which controls actuators for the transmission, the clutch, etc. and also provides pressure necessary for the lubrication of these parts. Many of such hydraulic controllers include an air- or water-cooled oil cooler, which cools the hydraulic oil whose temperature increases while it is used for the control and lubrication of the transmission, the clutch, etc.

In such a hydraulic controller, the following method is used commonly. A pressure regulating valve is provided in the circuit of the hydraulic oil to adjust the pressure of the hydraulic oil, and the oil discharged from this pressure regulating valve is returned through an oil cooler to a tank (or a drain pan). In addition to this method, there is another method in which the discharge port of the above mentioned pressure regulating valve is constructed in two ports, one for a line which passes through the oil cooler and the other for a line used for recirculation. In this construction, when the amount of the oil discharged from the pressure regulating valve increases, the oil is directly returned through the recirculation line to the suction port of the pump.

Figure 6:
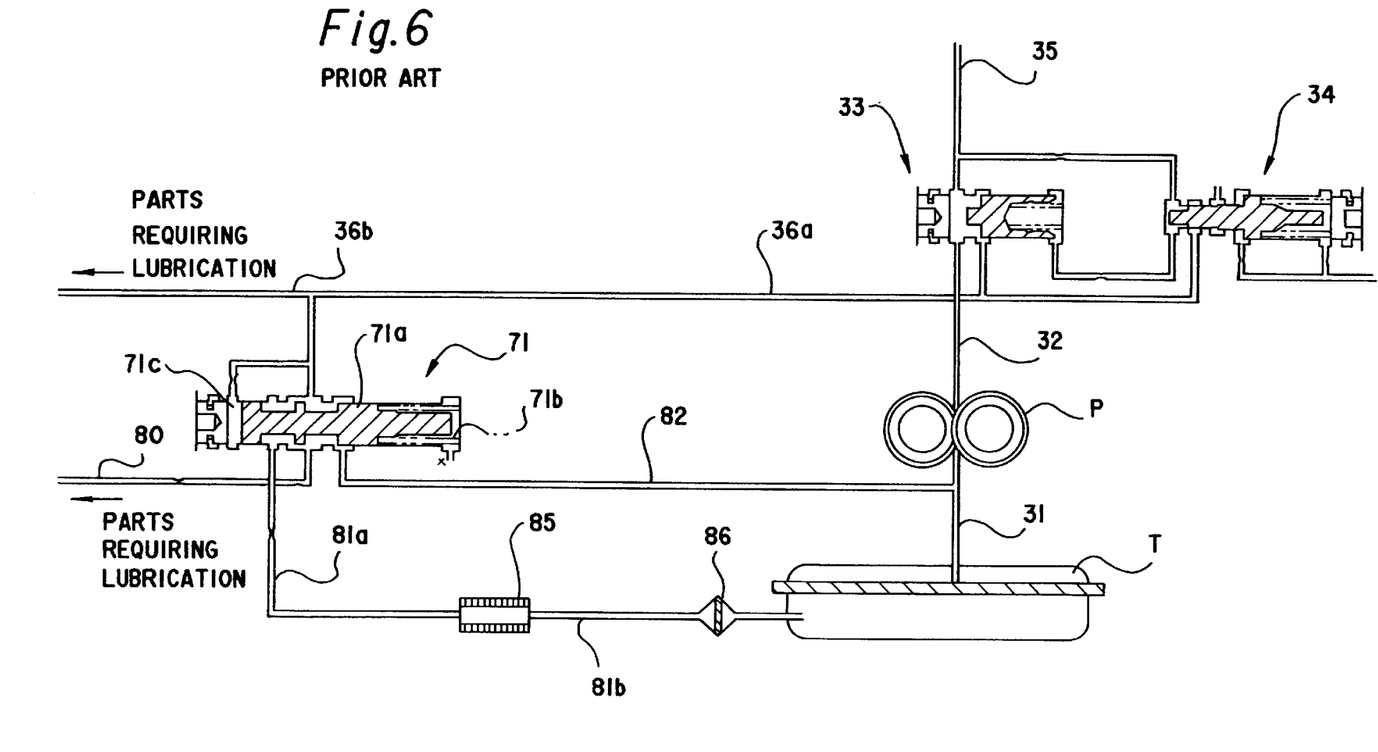
FIG. 6 is a hydraulic circuit diagram showing the construction of a prior art lubrication pressure controller.

FIG. 6 is a circuit diagram of a conventional lubrication pressure controller which includes a recirculation line. In this device, the hydraulic oil in a tank T is sucked by a pump P through a suction strainer and a suction oil passage 31. After the pressure of the oil is adjusted by two regulator valves 33 and 34 to a predetermined hydraulic pressure (line pressure), the oil is then supplied through a line 35 to a speed change control valve. Excess oil in the pressure adjustment performed by the regulator valves 33 is dumped to a lubrication oil passage 36 (36a and 36b), and the oil in this oil passage is supplied as lubrication oil to the components of the transmission which need lubrication (e.g., to the starting clutch, the planetary gears, the bearing parts of the shafts, etc.). The lubrication oil after being supplied to the speed change mechanism and the other components which require lubrication returns to the tank T through oil passages, for example, passages constituted by the inner walls of the transmission (not shown).

In the lubrication oil passage 36 (between 36a and 36b), which leads the hydraulic oil to the parts which require lubrication, a lubrication valve 71 is provided to adjust the pressure of the oil used for the lubrication. This valve comprises a spool 71a which is biased leftward by a spring 71b. The hydraulic oil moves this spool 71a rightward in correspondence with the magnitude of the pressure supplied into the oil chamber 71c and performs a pressure adjustment which achieves a predetermined lubrication pressure Pb needed for supplying the oil to the parts of the transmission which require lubrication.

For example, when the supply pressure (i.e., the discharge pressure of the regulator valves 33 and 34) in the lubrication oil passage 36a is smaller than the predetermined lubrication pressure Pb, the spool 71a is shifted leftward by the spring 71b, so the hydraulic oil flowing in the lubrication oil passage 36a is partly supplied through a line 80 to the parts requiring lubrication but not through the other lines except the line 36b. On the other hand, if the supply pressure in the lubrication oil passage 36a becomes greater than the predetermined lubrication pressure Pb, the spool 71a is shifted rightward by the hydraulic pressure supplied into the oil chamber 71c, the pressure overpowering the resistance of the spring 71b. In this condition, the line 81a which passes through an oil cooler 85 to the tank T is open together with the line 80, so part of the hydraulic oil is cooled and returned to the tank T. If the supply pressure increases further, then the spool 71a is shifted further rightward (this condition is shown in FIG. 6). In this condition, another line 82 is open together with these lines 80 and 81a. This line 82, which is called "recirculation line", returns directly to the suction oil passage 31 of the pump P without passing through the oil cooler 85 and the tank T.

In vehicular transmissions, it is general that the pump P is directly connected to the output shaft of the engine, so the rotational speed of the pump P is proportional to that of the engine. Thus, there is a tendency that the greater the rotational speed of the engine, the higher the pressure of the hydraulic oil which is discharged from the regulator valves 33 and 34 and supplied into the lubrication oil passage 36a. This means that the operation of the valves described above is performed in correspondence with the rotational speed of the engine and that when the rotational speed of the engine is relatively high, the oil is flown through the recirculation line 82 directly to the suction oil passage 31 of the pump P in addition to the line 81 (81a and 81b) passing through the oil cooler 85.

In addition to this method, which controls the supply of the hydraulic oil to the oil cooler in correspondence with the pressure in the lubrication oil passage by means of the stroke of a valve spool as described above, there is another method in which the oil passage leading to the parts requiring lubrication and the oil passage leading to the oil cooler are switched by a (three-way) electromagnetic valve. This method is disclosed, for example, in Japanese Laid-Open Patent Publication No. H4(1992)-316766. Yet another method, which controls the flow of the hydraulic oil to the oil cooler, is disclosed in Japanese Laid-Open Utility-Model Publication No. H1(1989)-135254. In this method, an electromagnetic valve is provided in the oil passage leading to the oil cooler, and the flow of the hydraulic oil is changed by the on-off control of the valve.

However, in the previously mentioned prior-art lubrication pressure controller (e.g., one shown in FIG. 6), if the lubrication valve 71 is disturbed by an external factor, for example, if the pressure in the lubrication oil passage 36a is disturbed by a drastic change in the amount discharged from the pump or in the control back pressure of the regulator valve 33, and thereby the spool of the lubrication valve experiences an overstroke rightward, then the hydraulic oil flows excessively into the recirculation line 82 and causes a shortage in the amount of the hydraulic oil which is supplied to the lubrication oil passage 36b and to the oil cooler. Furthermore, if the spool is locked in such an overstroke condition, then there is a possibility that the recirculation line 82 will experience a negative pressure by the suction pressure of the pump P and will draw the hydraulic oil into the lubrication oil passage 36a. There is a concern that if this condition occurs, then the shortage of the hydraulic oil which should be supplied to the parts requiring lubrication would continue and result in a lubrication failure.

In the method which switches the oil passage leading to the parts requiring lubrication and the oil passage leading to the oil cooler by a (three-way) electromagnetic valve as disclosed, for example, in Japanese Laid-Open Patent Publication No. H4(1992)-316766, by construction, this switching involves all the hydraulic oil. Thus, the system requires a large electromagnetic valve capable of handling a relatively large flow, and this requirement makes it difficult that this method is to be applied to the condition which requires both the lubrication and the cooling of the transmission.

In the method which is disclosed in Japanese Laid-Open Utility-Model Publication No. H1(1989)-135254, the electromagnetic valve that is provided in the oil passage leading to the oil cooler is used for the on-off control of the valve to change the flow of the hydraulic oil. This control can adjust the flow to the oil cooler only to two levels. Therefore, to balance the flow for the oil cooler with the flow for the recirculation line, another additional valve is necessary.

SUMMARY OF THE INVENTION

It is an object of the present invention to enable control of lubrication oil supply even under the above mentioned spool lock condition.

It is another object of the present invention to prevent locking of one valve spool on an open side (i.e., an open stick condition) from causing a lubrication failure.

It is yet another object of the present invention to supply hydraulic oil appropriately to oil passages for lubrication, cooling and recirculation, respectively in correspondence with an operational condition.

In order to achieve these objectives, the present invention provides a lubrication pressure controller which comprises a tank, a pump, a lubrication oil passage, a lubrication pressure regulating valve, a first discharge oil passage (e.g., the line 51 of the embodiment described in the following section), an oil cooler, a cooler pressure regulating valve and a second discharge oil passage (e.g., the line 52 of the embodiment described in the following section). The tank stores hydraulic oil, which is sucked by the pump. The hydraulic oil discharged from the pump is led by the lubrication oil passage to parts which need lubrication, and in the lubrication oil passage, the lubrication pressure regulating valve adjusts the pressure of the hydraulic oil. The first discharge oil passage returns the hydraulic oil which is discharged in the pressure adjustment performed by the lubrication pressure regulating valve to the tank, and the oil cooler is provided at one point en route in the first discharge oil passage. The cooler pressure regulating valve is provided between the lubrication pressure regulating valve and the oil cooler and adjusts the pressure of the hydraulic oil being supplied to the oil cooler. The second discharge oil passage returns the hydraulic oil discharged in the pressure adjustment performed by the cooler pressure regulating valve into a suction oil passage (e.g., the line 31 of the embodiment described in the following section) located between the tank and the pump.

In this construction, the lubrication pressure controller includes the lubrication pressure regulating valve, which adjusts the pressure of the oil supplied to the lubricated parts, and the cooler pressure regulating valve, which is positioned in the discharge oil passage of the lubrication pressure regulating valve and which adjusts the pressure of the oil supplied to the oil cooler, and the discharge oil passage of the cooler pressure regulating valve comprises a recirculation line. Thus, even if one of the regulating valves is stuck in its open condition, the other valve is still capable of adjusting the pressure of the line. Therefore, this lubrication pressure controller has a good lubrication performance.

A second embodiment of lubrication pressure controller according to the present invention comprises a tank, which stores hydraulic oil, a pump, which sucks and discharges the hydraulic oil, a lubrication oil passage, which leads the hydraulic oil discharged from the pump to lubricated parts, a lubrication pressure regulating valve, which adjusts the pressure of the hydraulic oil in the lubrication oil passage, a first discharge oil passage (e.g., the line 51 of the embodiment described in the following section), which returns the hydraulic oil discharged in the pressure adjustment performed by the lubrication pressure regulating valve to the tank, an oil cooler, which is provided at one point en route in the first discharge oil passage and which cools the hydraulic oil, and signal pressure generating means, which applies a signal pressure to the lubrication pressure regulating valve in correspondence with a driving condition. In this controller, the pressure in the lubrication oil passage is adjusted by the signal pressure in correspondence with a driving condition.

In this construction, the lubrication pressure controller is capable of changing the pressure of the oil supplied to the lubricated parts, which pressure is adjusted by the lubrication pressure regulating valve, in correspondence with a driving condition. Thus, the hydraulic oil can be allocated both for the lubrication and for the cooling as desired in correspondence with, for example, the rotational speed of the engine, the speed change ratio, the temperature of the oil, etc. Therefore, the distribution of the hydraulic oil is adjustable with an appropriate balance between the flows for the lubrication and for the cooling without sacrificing any of the flows.

A third embodiment of lubrication pressure controller according to the present invention comprises a tank, which stores hydraulic oil, a pump, which sucks the hydraulic oil from the tank and discharges it, a lubrication oil passage, which leads the hydraulic oil discharged from the pump to lubricated parts, a return oil passage (e.g., the line 51 of the embodiment described in the following section), which returns portion of the hydraulic oil to the tank, an oil cooler, which is provided at one point en route in the return oil passage and cools the hydraulic oil, a cooler pressure regulating valve, which is provided in the return oil passage on the upstream side of the oil cooler and which adjusts the pressure of the hydraulic oil being supplied to the oil cooler, a second discharge oil passage (e.g., the line 31 of the embodiment described in the following section), which returns the hydraulic oil discharged in the pressure adjustment performed by the cooler pressure regulating valve into a suction oil passage located between the tank and the pump, and signal pressure generating means, which applies a signal pressure to the cooler pressure regulating valve in correspondence with a driving condition. In this controller, the pressure of the oil supplied to the oil cooler in the return discharge oil passage is adjusted by the signal pressure, which corresponds to a driving condition.

In this construction, the lubrication pressure controller is capable of changing the pressure of the oil supplied to the oil cooler, which pressure is adjusted by the cooler pressure regulating valve, in correspondence with a driving condition. Thus, the hydraulic oil can be allocated both to the oil cooler and to a recirculation line as desired in correspondence with, for example, the temperature of the oil, the oil level, the rotational speed of the engine, etc. Therefore, the balance of the flows of the hydraulic oil to the oil cooler and to the recirculation line is adjustable appropriately.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DESCRIPTION OF THE PREFERRED EMBODIMENTS

Figure 1:
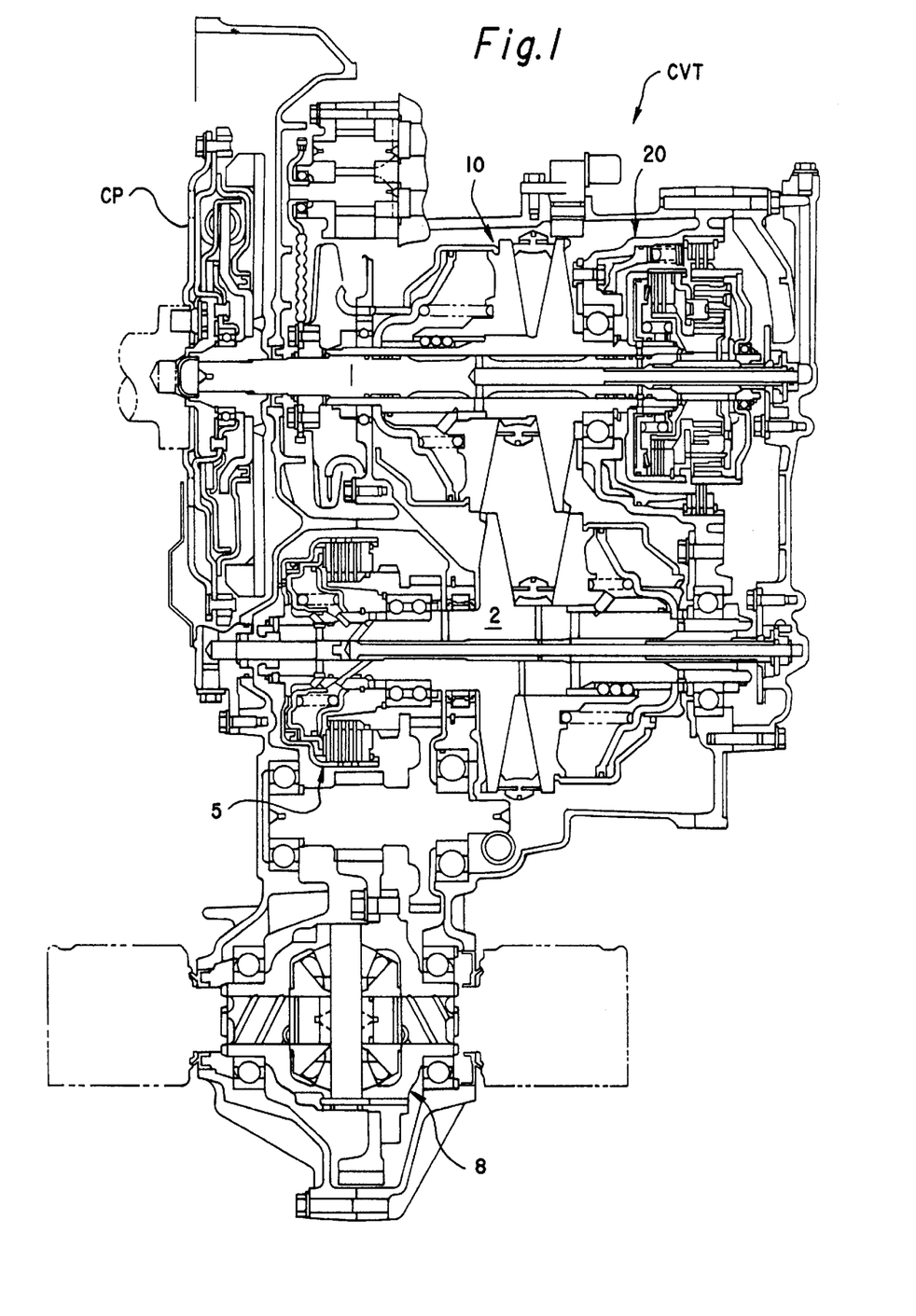
FIG. 1 is a cross-sectional view showing a continuously variable transmission which is equipped with a hydraulic controller according to the present invention.
Figure 2:
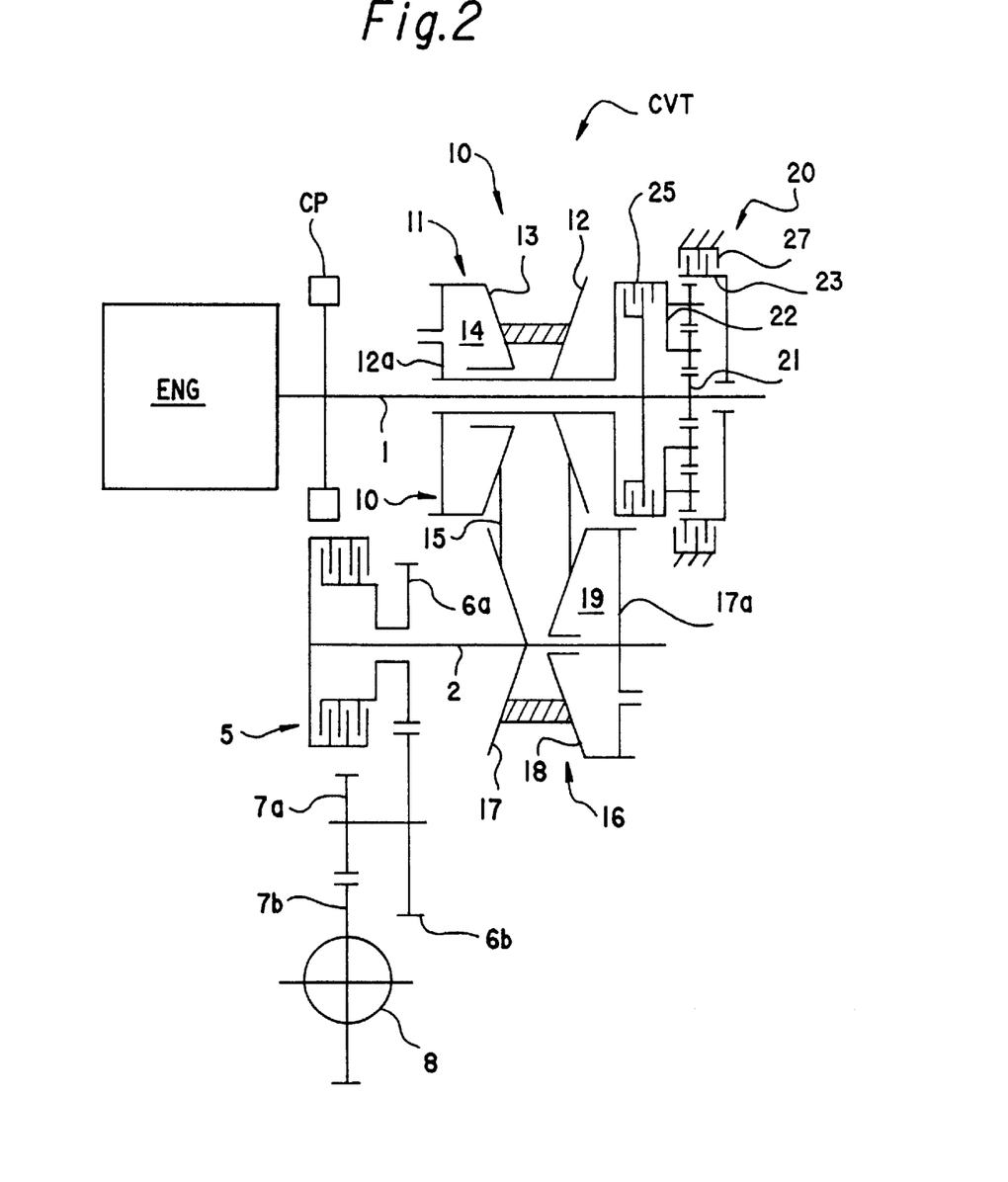
FIG. 2 is a schematic diagram showing the construction of the mechanisms for power transmission of the transmission.

FIGS. 1 and 2 show the construction of a continuously variable transmission CVT, which is equipped with a hydraulic controller according to the present invention. This continuously variable transmission CVT is a belt-type continuously variable transmission which uses a metal V-belt, and it comprises a metal V-belt mechanism 10, which is disposed between the input shaft 1 and the countershaft 2 of the transmission, a planetary gear type forward-reverse selector mechanism 20, which is disposed between the input shaft 1 and the drive pulley 11 of the metal V-belt mechanism 10, and a starting clutch 5, which is disposed between the countershaft 2 and the output member (including a differential mechanism 8). This continuously variable transmission CVT is used on a vehicle, so the input shaft 1 is connected through a coupling mechanism CP with the output shaft of the engine ENG, and the power transmitted to the differential mechanism 8 is used for driving the right and left wheels of the vehicle.

The metal V-belt mechanism 10 comprises the drive pulley 11, which is disposed over the input shaft 1, a driven pulley 16, which is disposed on the countershaft 2, and the metal V-belt 15, which is disposed around these pulleys 11 and 16.

The drive pulley 11 comprises a stationary pulley half 12, which is disposed rotatably over the input shaft 1, and a movable pulley half 13, which is movable with respect to the stationary pulley half 12 in the axial direction of the pulley 11. On the outside of the movable pulley half 13, a drive-side cylinder chamber 14 is defined by a cylinder wall 12a which is fixed to the stationary pulley half 12. The pressure supplied into the cylinder chamber 14 generates a thrust which shifts the movable pulley half 13 in the axial direction of the drive pulley.

The driven pulley 16 comprises a stationary pulley half 17, which is fixed on the countershaft 2, and a movable pulley half 18, which is movable with respect to the stationary pulley half 17 in the axial direction of the pulley. On the outside of the movable pulley half 18, a driven-side cylinder chamber 19 is defined by a cylinder wall 17a which is fixed to the stationary pulley half 17. The pressure supplied into the cylinder chamber 19 generates a thrust which shifts the movable pulley half 18 in the axial direction of the driven pulley.

The hydraulic pressure which is supplied into these cylinder chambers 14 and 19 is controlled to generate appropriate lateral thrusts in these two pulleys, which thrusts change the widths of the V grooves of the drive and driven pulleys 11 and 16 without any slip of the belt 15 and thereby change the pitch radii of the respective pulleys for the V belt 15 to vary the speed change ratio of the transmission continuously.

The planetary gear type forward-reverse selector mechanism 20 comprises a double-pinion planetary gear train. This planetary gear train comprises a sun gear 21, which is connected to the input shaft 1, a carrier 22, which is connected to the stationary pulley half 12 of the drive pulley 11, and a ring gear 23, which can be held against rotation by a reverse brake 27. The planetary gear train also comprises a forward clutch 25, which can connect the sun gear 21 and the ring gear 23. When this forward clutch 25 is engaged, all the gears 21, 22 and 23 rotate together with the input shaft 1 as a one body, and the drive pulley 11 is driven in the same direction as the input shaft 1 (i.e., the forward direction of the vehicle). On the other hand, if the reverse brake 27 is engaged, the ring gear 23 is held stationary, so the carrier 22 rotates in the direction opposite to that of the sun gear 21, and the drive pulley 11 is driven in the direction opposite to that of the input shaft 1 (i.e., the reverse direction).

The starting clutch 5 is a clutch which controls the power transmission between the countershaft 2 and the output members of the transmission. When the starting clutch 5 is engaged, it is possible to transmit the power therebetween. The pressure supplied to the starting clutch 5 (clutch control pressure) is controlled to adjust the hydraulic engaging force of the clutch so that the torque transmission capacity (torque capacity) between the input side and the output side of the clutch is controllable. Therefore, when the starting clutch 5 is engaged, the output of the engine, after going through the speed change by the metal V-belt mechanism 10, is transmitted through gears 6a, 6b, 7a and 7b to the differential mechanism 8 and then divided and transmitted by the differential mechanism 8 to the right and left wheels (not shown). When the starting clutch 5 is released, this power transmission is not carried out, and the transmission is in the neutral condition.

The hydraulic controller comprises a speed change controller, a lubrication pressure controller and an oil cooler. The speed change controller controls the actuation of hydraulic actuators such as the forward clutch 25, the reverse brake 27 and the starting clutch 5 of the planetary gear type forward-reverse selector mechanism 20 and the drive and driven pulleys 11 and 16 of the continuously variable transmission CVT. The lubrication pressure controller supplies lubrication oil to the parts which need lubrication in the mechanisms of the transmission, and the oil cooler cools the oil whose temperature has risen after actuating the actuators and being used as lubricant.

Figure 3:
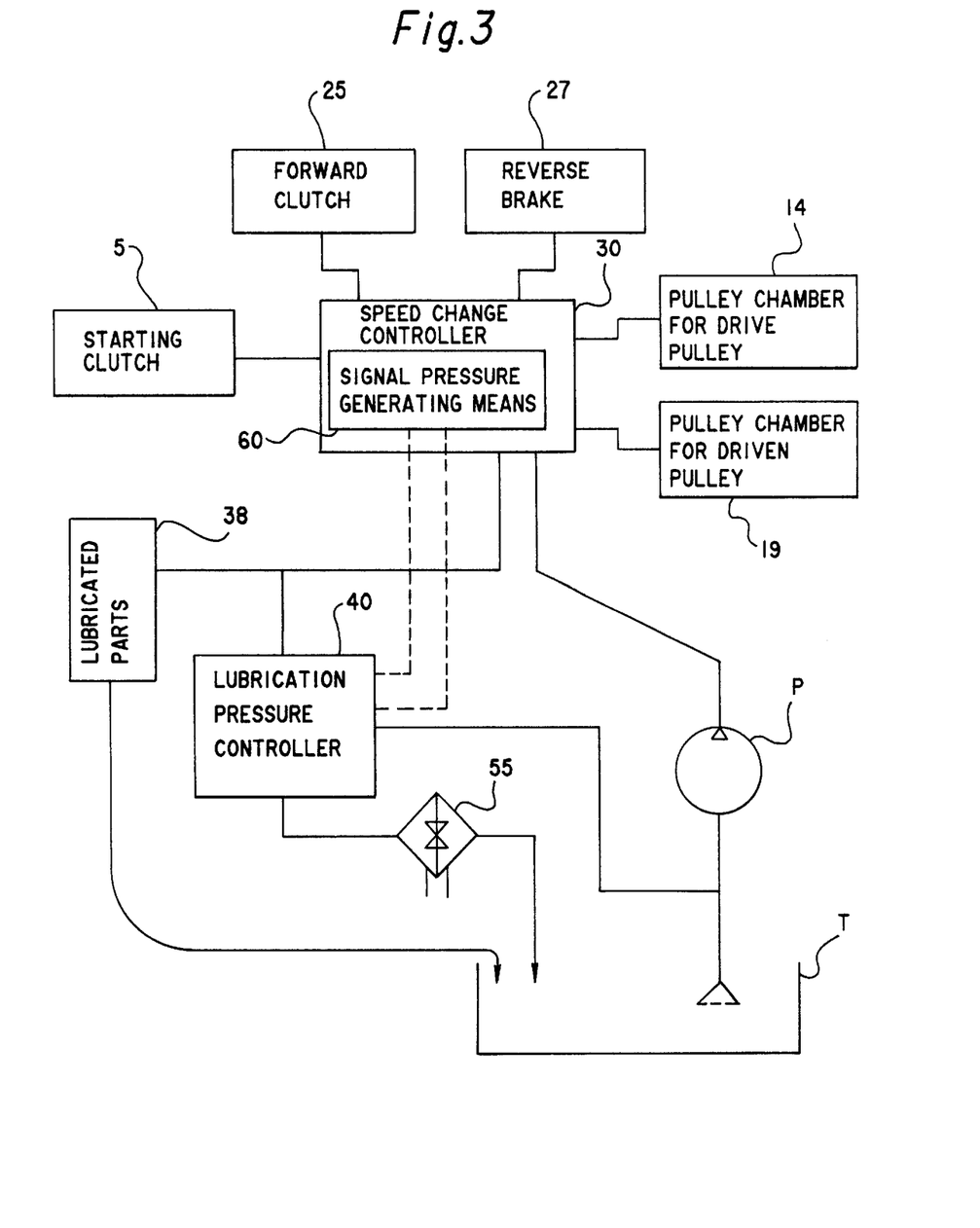
FIG. 3 is a block diagram showing the construction of the hydraulic controller of the transmission.

FIG. 3 shows the whole construction of the hydraulic controller. The hydraulic oil supplied from the tank T by the pump P acquires a constant pressure by the regulator valves 33 and 34, which are included in the speed change controller 30, and this pressure is used through speed control valves, each of which is controllable to actuate a respective hydraulic actuator, such hydraulic actuators being the starting clutch 5, the forward clutch 25, the reverse brake 27 and the cylinder chambers 14 and 19 of the drive and driven pulleys. Excess oil in the pressure control carried out at the regulator valves is supplied through lubrication oil passages to lubricated parts 38 such as actuation devices and bearing portions. The lubrication pressure controller 40 is positioned in the lubrication oil passages, and it performs pressure control to adjust the pressure of the oil being supplied to the lubricated parts and to return portion of the oil supplied into the lubrication oil passages to the oil cooler 55 or directly to an oil passage which leads to the suction of the pump without passing the oil through the oil cooler, etc. In addition, the speed change controller 30 includes signal pressure generating means 60, which generates a signal pressure in correspondence with the driving condition of the transmission. The signal pressure is generated in correspondence with, for example, the rotational speed of the engine, the speed change ratio, the temperature of the hydraulic oil, etc. and is applied to the lubrication pressure controller 40.

Figure 4:
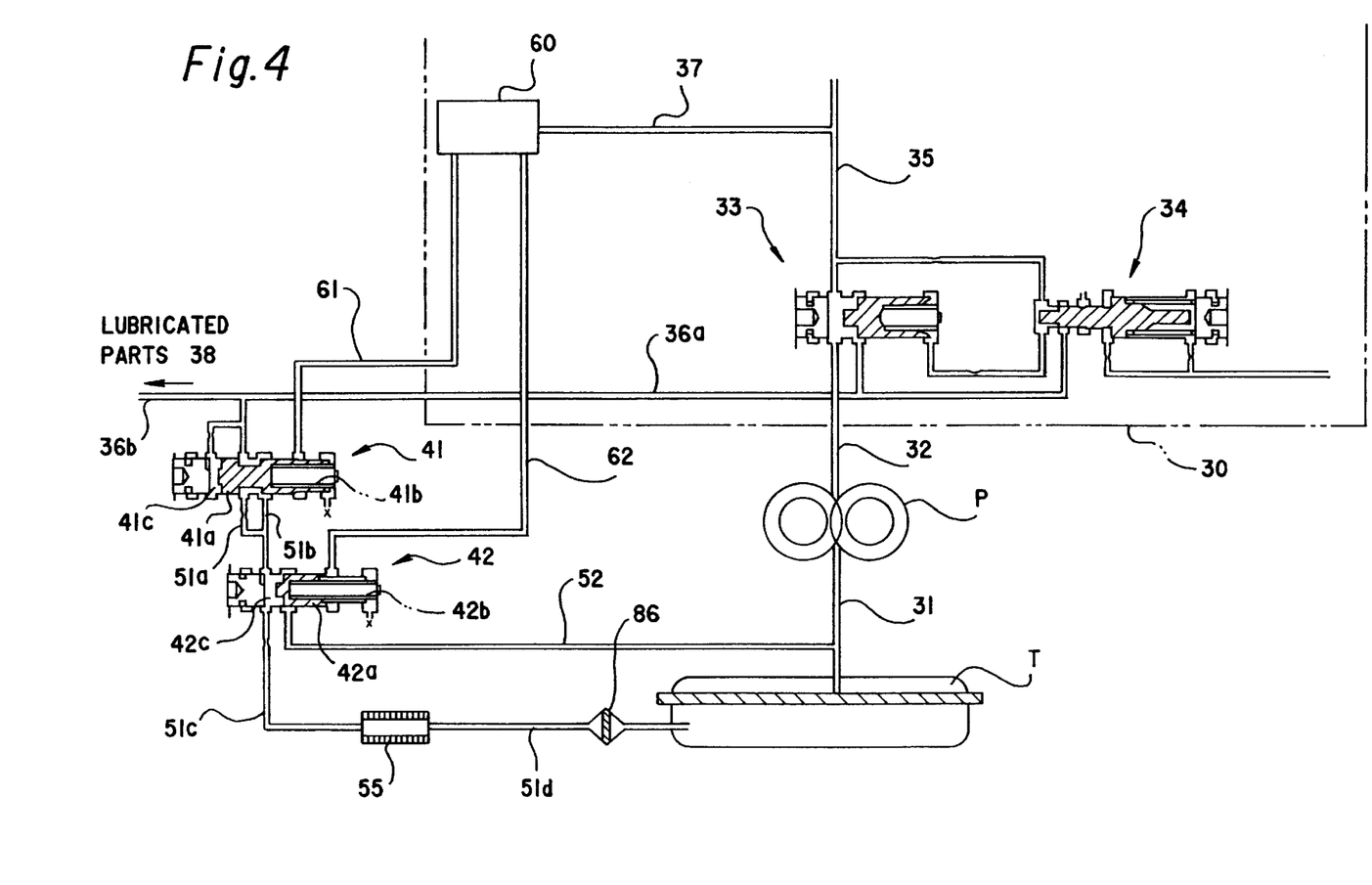
FIG. 4 is a hydraulic circuit diagram showing the construction of an embodiment of lubrication pressure controller according to the present invention.

FIG. 4 shows the lubrication pressure controller according to the present invention. The hydraulic oil in the tank T is sucked by the pump P through a suction strainer provided in the tank and through the suction oil passage 31, and the pressure of the oil is adjusted to a predetermined working pressure (referred to as "line pressure") by the two regulator valves 33 and 34. Then, this oil is supplied through a line 35 to the speed change control valves of the transmission. Excess oil in the pressure control performed at the regulator valves is dumped into the lubrication oil passage 36 (36a and 36b) and is led as lubrication oil to the parts of the transmission which need lubrication (e.g., the starting clutch 5, the planetary gear 20, and the bearing portions of the shafts). The oil supplied to the speed change controller and the lubricated parts in this way returns to the tank T through passages constituted by, for example, the inner walls of the transmission (not shown in the drawing). Each "X" mark in the drawings represents a connection to drainage.

A lubrication pressure regulating valve 41 is provided to the lubrication oil passage 36 (between 36a and 36b), which lead the hydraulic oil to the lubricated parts, to adjust the pressure of the oil for the lubrication. The lubrication pressure regulating valve 41 includes a spool 41a, which is biased leftward by a spring 41b. The pressure applied into the oil chamber 41c of this valve pushes the spool rightward with the displacement which is proportional to the magnitude of the pressure. When the pressure in the oil chamber 41c becomes equal to or greater than the lubrication pressure Pb, this valve discharges the hydraulic oil into a line 51b to reduce the pressure in the line 36. In this way, the balance between the force generated in the spring 41b and the pressure applied into the oil chamber 41c adjusts the opening of the valve to the line 51b so that the pressure applied for the lubrication is adjusted to the predetermined lubrication pressure Pb in this pressure adjustment operation.

To the lubrication pressure regulating valve 41, a line 51a with an orifice is provided to discharge a certain amount of oil into the line 51b even when the pressure in the lubrication oil passage 36a is smaller than the lubrication pressure Pb, in which condition, this valve is closed. In addition, the signal pressure generating means 60, whose signal pressure is supplied to the lubrication pressure regulating valve 41 through a line 61, sets the lubrication pressure Pb to a desired pressure in correspondence with a driving condition.

The hydraulic oil discharged from the lubrication pressure regulating valve 41 returns to the tank T through the line 51 which includes the oil cooler 55 on the way, and a cooler pressure regulating valve 42 is provided between the lubrication pressure regulating valve 41 and the oil cooler 55.

The cooler pressure regulating valve 42 is an inline type regulating valve, and it includes a spool 42a, which is biased leftward by a spring 42b. The pressure applied into the oil chamber 42c of this valve acts against the force of the spring 42b and shifts the spool 42a rightward. When the pressure in the oil chamber 42c increases to a certain point, the hydraulic oil is released into a line 52 to balance the force of the spring with the force generated from the pressure so that the supply pressure to the oil cooler 55 is adjusted to and maintained at a predetermined cooler supply pressure Pc. In addition, the signal pressure generating means 60, whose signal pressure is supplied to the cooler pressure regulating valve 42 through a line 62, sets the cooler supply pressure Pc to a desired pressure in correspondence with a driving condition.

The hydraulic oil discharged from the cooler pressure regulating valve 42 is recirculated through the recirculation line 52, which leads to the suction oil passage 31 of the pump P, without passing through the oil cooler and the tank T.

Figure 5:
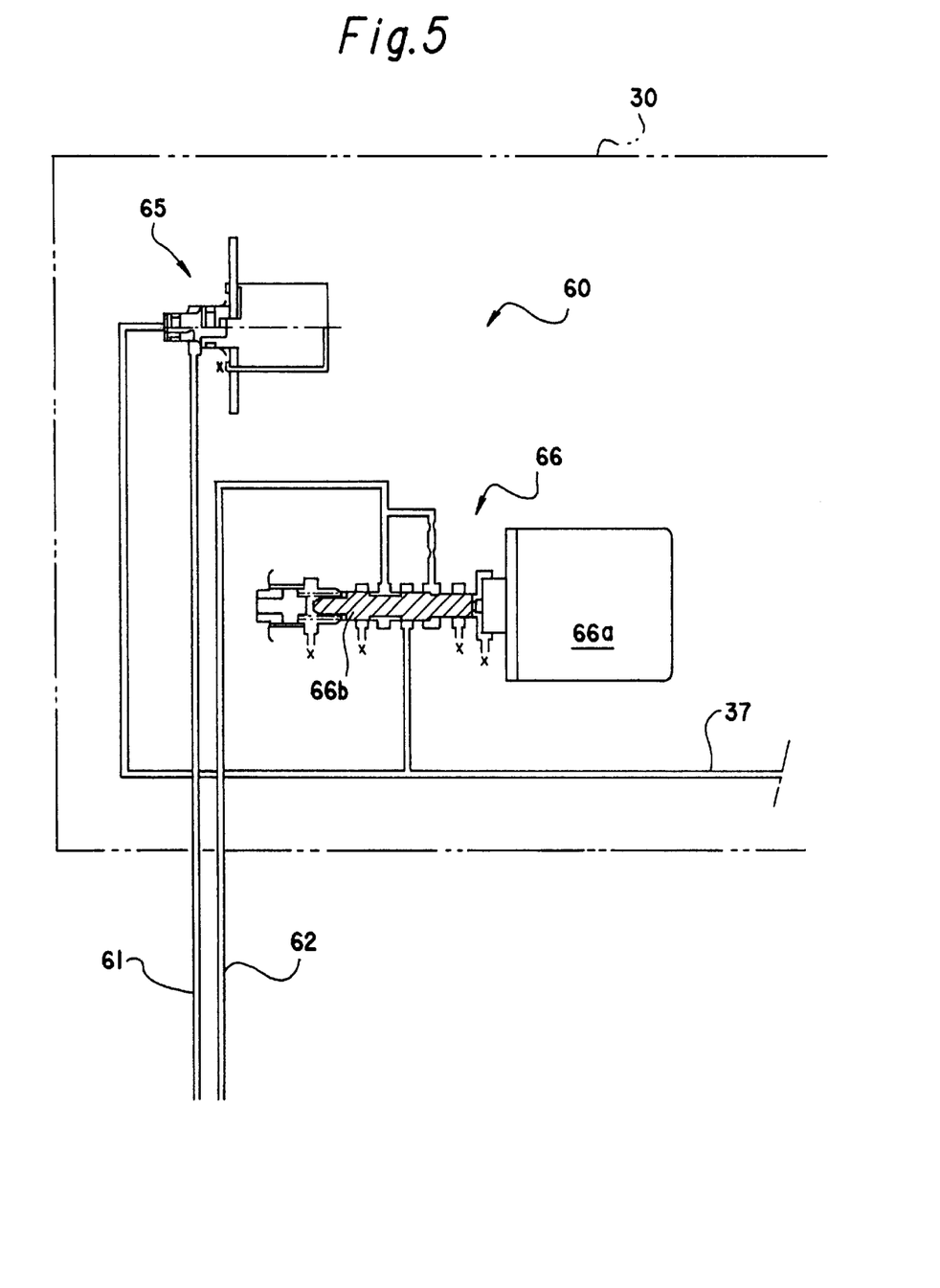
FIG. 5 is a hydraulic circuit diagram showing an example of means for generating a signal pressure, of the lubrication pressure controller.

In this embodiment, the signal pressure generating means 60 is constructed, for example, as shown in FIG. 5 with two electromagnetic valves, which are used in the speed change controller 30. As shown in the drawing, these electromagnetic valves receive the line pressure (or a pressure which is lower than the line pressure, produced by an additional reducing valve) through a line 37, respectively, and they generate the signal pressure into the lines 61 and 62 in response to an electrical control signal which is received depending upon the driving condition of the transmission.

One of the valves 65 is a normally open type solenoid valve, and to control the supply of the signal pressure into the line 61, the opening and shutting of this valve is controlled by an electrical control signal. The other valve 66 is a linear solenoid valve, and the pressure supplied into the line 62 is controlled in correspondence with the magnitude of the electrical current which is applied to the linear solenoid 66a of this valve. The mention of these types here is not intended to specify these electromagnetic valves, and any type of valves can be used here as long as the signal pressure is produced appropriately.

In this construction of the lubrication pressure controller, the hydraulic oil discharged from the regulator valves 33 and 34 into the line 36a is adjusted by the lubrication pressure regulating valve 41 to achieve the predetermined lubrication pressure Pb, which oil is then supplied through the line 36b to the lubricated parts 38. The hydraulic oil dumped by the lubrication pressure regulating valve 41 into the line 51b is supplied to the cooler pressure regulating valve 42, which adjusts the pressure applied to the oil cooler to the predetermined cooler supply pressure Pc. The oil at this cooler supply pressure Pc passes through the line 51c and is cooled by the oil cooler 55, and it then returns through a filter 86 to the tank T. The oil dumped from the cooler pressure regulating valve 42 in the pressure adjustment returns through the recirculation line 52 into the suction oil passage 31 without passing through the oil cooler 55 and the tank T.

In this construction of the lubrication controller, the cooler pressure regulating valve 42 is positioned in the discharge oil passage 51b of the lubrication pressure regulating valve 41, and the oil discharged is returned through the recirculation line 52 to the suction oil passage 31 of the pump. Therefore, a priority can be set for the hydraulic oil supplied through the line 36 in the following order: lubrication>cooling>recirculation. Furthermore, the ratio of the amount of the oil going through these three routes can be set to a desired ratio.

Moreover, if the cooler pressure regulating valve 42 is locked in its open condition (open stick), in which the line 51b and the recirculation line 52 are open, as the lubrication pressure regulating valve 41 maintains the pressure adjustment function for the lubrication oil passage 36b, the hydraulic oil will not be drawn into the recirculation line 52 in an amount to cause a shortage of lubrication oil. In a similar way, if the lubrication pressure regulating valve 41 is locked in an open stick condition for some reason, as the cooler pressure regulating valve 42 maintains the pressure adjustment function, the lubrication oil is kept in a sufficient amount to maintain a good lubrication performance.

The lubrication pressure controller is constructed such that a certain flow of the hydraulic oil is maintained to the lubrication pressure regulating valve 41 even when the pressure supplied to the lubrication oil passage 36 is smaller than the predetermined lubrication pressure Pb and even when this valve is closed. Therefore, a flow to the oil cooler 55 is maintained, for example, even when the vehicle is kept in idling condition for a long time, so any increase in the temperature of the hydraulic oil is prevented.

The lubrication pressure controller includes an on-off solenoid valve 65 (signal pressure generating means 60), which applies the signal pressure to the lubrication pressure regulating valve 41 in correspondence with a driving condition. Therefore, the actuation of the solenoid valve 65 is controlled in correspondence with a driving condition (e.g., the rotational speed of the engine, the speed change ratio, the temperature of the hydraulic oil, the oil level in the tank T, etc.) to adjust the balance between the amount of the oil for the lubrication and the amount cooled by the oil cooler 55 as desired.

Therefore, even when the rotational speed of the engine is relatively low, for example, because the vehicle is cruising at a low rotational speed, and thereby the pressure applied to the lubrication oil passage 36a is also low, the above mentioned predetermined lubrication pressure Pb is lowered by turning off the signal pressure or by lowering the signal pressure. In this way, the flow discharged into the line 51b is increased to maintain the flow of the oil to the oil cooler 55, thereby preventing the oil from overheating. Also, if a high oil level in the tank T (oil pan) is preferred while the lubrication does not require much pressure (e.g., the vehicle is in deceleration at a low temperature), then the oil level in the tank T is increased by increasing the flow of the oil to the oil cooler 55 in the same way as the above, to prevent inclusion of the air into the suction oil passage 31 of the pump.

As mentioned above, the lubrication pressure controller includes the linear solenoid valve 66 (signal pressure generating means 60), which applies the signal pressure to the cooler pressure regulating valve 42 in correspondence with a driving condition. Therefore, the balance between the flow of the oil being cooled by the oil cooler and the flow returning directly to the suction oil passage 31 of the pump P is adjustable as desired in correspondence with a driving condition (e.g., the temperature of the hydraulic oil, the oil level in the tank T, the rotational speed of the engine, etc.).

As such, when the temperature of the hydraulic oil is relatively low, i.e., there is no need for the oil to be cooled by the oil cooler 55, and the oil has a high viscosity (and a high resistance to pass through the suction strainer), the cooler supply pressure Pc is lowered by lowering the signal pressure to increase the flow into the recirculation line 52, thereby supplementing the oil being sucked into the pump and preventing an occurrence of shortage of oil for the pump. On the other hand, when the temperature of the oil is high, or a high oil level in the tank is preferred, the cooler supply pressure Pc is increased by raising the signal pressure to reduce the amount of the oil being discharged into the recirculation line 52, thereby promoting the cooling performed by the oil cooler 55 and increasing the amount of the oil being returned to the tank. In this way, the flow of the oil is adjustable finely in correspondence with the driving condition.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.10-231549 filed on Aug. 18, 1998, which is incorporated herein by reference.

What is claimed is:

1. A lubrication pressure controller comprising:
    a tank, which stores hydraulic oil;
    a pump, which sucks the hydraulic oil from said tank and discharges the hydraulic oil;
    a lubrication oil passage, which leads the hydraulic oil discharged from said pump to lubricated parts;
    a lubrication pressure regulating valve, which adjusts pressure of the hydraulic oil being supplied into said lubrication oil passage;
    a first discharge oil passage, which returns the hydraulic oil discharged in pressure adjustment performed by said lubrication pressure regulating valve to said tank;
    an oil cooler, which is provided in series with said lubrication pressure regulating valve at one point en route in said first discharge oil passage and cools the hydraulic oil returning to said tank;
    a cooler pressure regulating valve, provided between said lubrication pressure regulating valve in said first discharge oil passage and said oil cooler and which adjusts pressure of the hydraulic oil exhausted from said lubrication pressure regulating valve and supplied to said oil cooler and then said oil tank; and
    a second discharge oil passage, which returns the hydraulic oil discharged in pressure adjustment performed by said cooler pressure regulating valve into a suction oil passage located between said tank and said pump.

2. The lubrication pressure controller as set forth in claim 1 further comprising:
    first signal pressure generating means, which produces a signal pressure in correspondence with a driving condition; wherein:
    the signal pressure produced by said signal pressure generating means is applied to said lubrication pressure regulating valve to adjust the pressure in said lubrication oil passage in correspondence with said signal pressure.

3. The lubrication pressure controller as set forth in claim 2, wherein said first signal pressure generating means comprises an on-off solenoid valve.

4. The lubrication pressure controller as set forth in claim 2, wherein said driving condition is at least one of a rotational speed of an engine, a speed change ratio, a temperature of the hydraulic oil, and an oil level in the tank.

5. The lubrication pressure controller as set forth in claim 1 further comprising:
   second signal pressure generating means, which produces a signal pressure in correspondence with a driving condition; wherein:
   the signal pressure produced by said signal pressure generating means is applied to said cooler pressure regulating valve to adjust the pressure of the oil supplied to said oil cooler in correspondence with said signal pressure.

6. The lubrication pressure controller as set forth in claim 5, wherein said second signal pressure generating means comprises a linear solenoid valve.

7. The lubrication pressure controller as set forth in claim 5, wherein said driving condition is at least one of a rotational speed of an engine, a speed change ratio, a temperature of the hydraulic oil, and an oil level in the tank.

8. A lubrication pressure controller comprising:
   a tank, which stores hydraulic oil;
   a pump, which sucks the hydraulic oil from said tank and discharges the hydraulic oil;
   a lubrication oil passage, which leads the hydraulic oil discharged from said pump to lubricated parts;
   a return oil passage, which branches out from said lubrication oil passage to return portion of the hydraulic oil to said tank;
   an oil cooler, which is provided at one point en route in said return oil passage and cools said hydraulic oil;
   a cooler pressure regulating valve, which is provided in said return oil passage on an upstream side of said oil cooler and which adjusts pressure of the hydraulic oil being supplied to said oil cooler;
   a second discharge oil passage, which returns the hydraulic oil discharged from said cooler pressure regulating valve into a suction oil passage located between said tank and said pump; and
   signal pressure generating means, which applies a signal pressure to said cooler pressure regulating valve in correspondence with a driving condition;
   wherein:
   the pressure of the hydraulic oil supplied to said oil cooler in said return oil passage is adjusted by said signal pressure.

* * * * *